US012611763B2

(12) United States Patent
Rogge et al.

(10) Patent No.: US 12,611,763 B2
(45) Date of Patent: Apr. 28, 2026

(54) CREEPER WITH ENHANCED MOBILITY

(71) Applicant: WHITESIDE MFG. CO., Delaware, OH (US)

(72) Inventors: Jason Reed Rogge, Belle Vernon, PA (US); Kirt E. Whiteside, Delaware, OH (US)

(73) Assignee: WHITESIDE MFG. CO., Delaware, OH (US)

( * ) Notice: Subject to any disclaimer, the term of this patent is extended or adjusted under 35 U.S.C. 154(b) by 273 days.

(21) Appl. No.: 18/507,281

(22) Filed: Nov. 13, 2023

(65) Prior Publication Data

US 2025/0153341 A1 May 15, 2025

(51) Int. Cl.
*B62H 5/00* (2006.01)
*B25H 5/00* (2006.01)

(52) U.S. Cl.
CPC .................................... *B25H 5/00* (2013.01)

(58) Field of Classification Search
CPC ......... A47C 9/027; A47C 7/006; A01B 75/00; B25H 5/00; B60N 2/14; B60N 2/24; B60N 2/38; B62B 2202/50; B62B 3/009; B62B 5/08
USPC .......................................................... 280/32.6
See application file for complete search history.

(56) References Cited

U.S. PATENT DOCUMENTS

| | | | | | |
|---|---|---|---|---|---|
| 2,033,037 | A * | 3/1936 | Lang | A47C 9/027 280/87.01 |
| 6,076,838 | A * | 6/2000 | Peterson | B25H 5/00 280/32.6 |
| 6,578,859 | B2 * | 6/2003 | Chen | B60N 2/14 280/87.01 |
| 7,032,907 | B1 * | 4/2006 | Marsh | B25H 5/00 280/32.6 |
| 7,114,742 | B1 * | 10/2006 | Sterns | B25H 5/00 280/32.6 |
| 7,510,208 | B1 * | 3/2009 | Lochmueller | B62B 7/08 280/638 |
| 7,712,750 | B2 * | 5/2010 | Whiteside | B25H 5/00 280/32.6 |
| 9,238,894 | B1 * | 1/2016 | Campos | E01H 5/02 |
| 9,339,928 | B1 * | 5/2016 | Obitts | B25H 5/00 |
| 9,925,659 | B1 * | 3/2018 | Clemmer | B25H 5/00 |
| D894,513 | S | 8/2020 | Sterns et al. | |
| 10,843,329 | B1 * | 11/2020 | Sterns | B25H 5/00 |
| 11,008,032 | B2 * | 5/2021 | O'Dell | B62B 5/0009 |
| 2006/0237922 | A1 * | 10/2006 | Forbis | B25H 5/00 280/32.6 |
| 2020/0039554 | A1 * | 2/2020 | O'Dell | B60R 22/18 |
| 2021/0284221 | A1 * | 9/2021 | Perez | B62B 5/0046 |

* cited by examiner

*Primary Examiner* — James A Shriver, II
*Assistant Examiner* — Hilary L Johns
(74) *Attorney, Agent, or Firm* — RENNER, KENNER, GREIVE, BOBAK, TAYLOR & WEBER CO. LPA

(57) ABSTRACT

A creeper provides improved mobility and includes a frame including longitudinally extending side rails and latitudinally extending cross-rails extending between the side rails, the cross-rails supporting a body pad, an upper-middle portion of the side rails including non-swivel wheels, a lower portion of the creeper including a caster assembly, the non-swivel wheels having a diameter at least one-and-a-half times a diameter of a wheel of the caster assembly.

18 Claims, 2 Drawing Sheets

CREEPER WITH ENHANCED MOBILITY

FIELD OF THE INVENTION

The invention relates to a creeper, such as often used by a mechanic when servicing vehicles. Embodiments of the invention relate to a creeper providing enhanced mobility.

BACKGROUND

A typical creeper, as used by mechanics or the like, includes a body pad carried by a frame. The frame is supported by a plurality of wheels which render the creeper mobile. A user of the creeper generally lays on the body pad and the plurality of wheels allow the user to maneuver the creeper to the desired service location, for example, under a vehicle.

There remains a need in the art for an improved creeper which provides enhanced mobility.

SUMMARY

It is thus an object of one aspect of the present invention to provide a creeper with enhanced mobility.

It is an object of another aspect of the invention to provide a creeper which allows for pivoting, steering, and moving the creeper in a tight, detailed way, while also allowing for movement over cracks and uneven terrain.

These and other objects of the present invention, as well as the advantages therefore over existing, prior art forms, which will become apparent from the description to follow, are accomplished by the improvements hereinafter described and clarified.

In accordance with one aspect of the present invention, a creeper includes a frame including longitudinally extending side rails and latitudinally extending cross-rails extending between the side rails, the cross-rails supporting a body pad, an upper-middle portion of the side rails including non-swivel wheels, a lower portion of the creeper including a caster assembly, the non-swivel wheels having a diameter at least one-and-a-half times a diameter of a wheel of the caster assembly.

In accordance with another aspect of the present invention, a creeper includes a frame including longitudinally extending side rails and latitudinally extending cross-rails extending between the side rails, the cross-rails supporting a body pad, the frame carrying non-swivel wheels and a caster assembly with a swivel wheel, the non-swivel wheels being rotatably carried on axles supported by the side rails, the caster assembly being positioned at a lower portion of the creeper.

BRIEF DESCRIPTION OF THE DRAWINGS

Reference is made to the accompanying drawings wherein.

DETAILED DESCRIPTION

Figure 1:
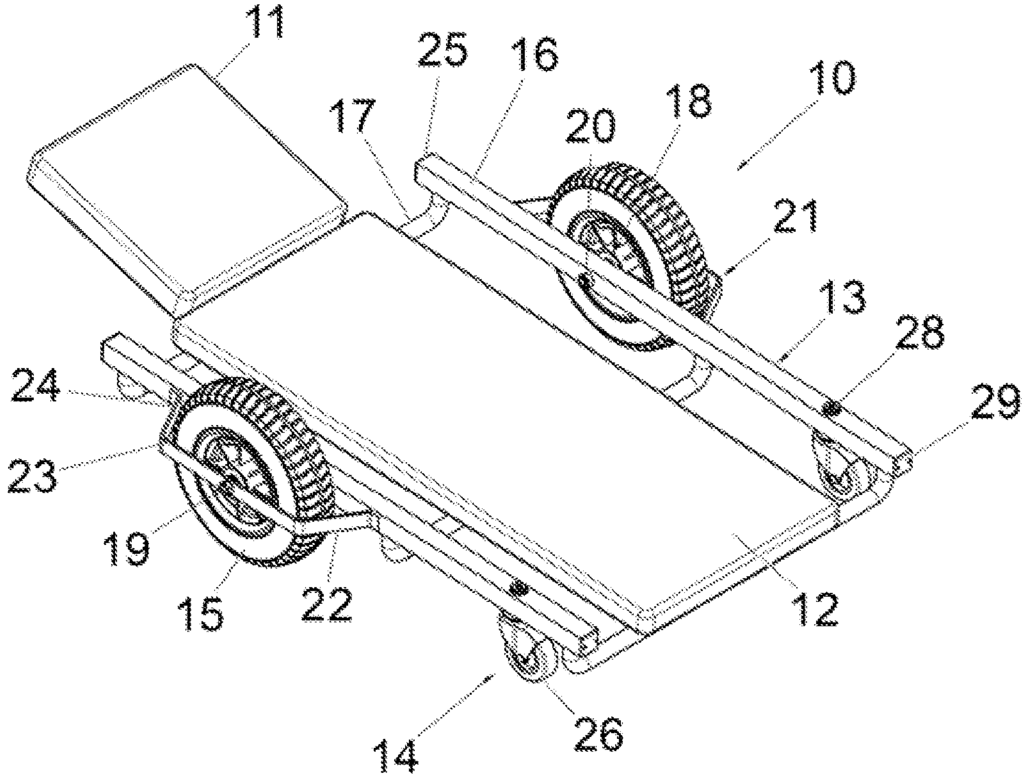
FIG. 1 is a perspective view of a creeper made in accordance with embodiments of the present invention.
Figure 2:
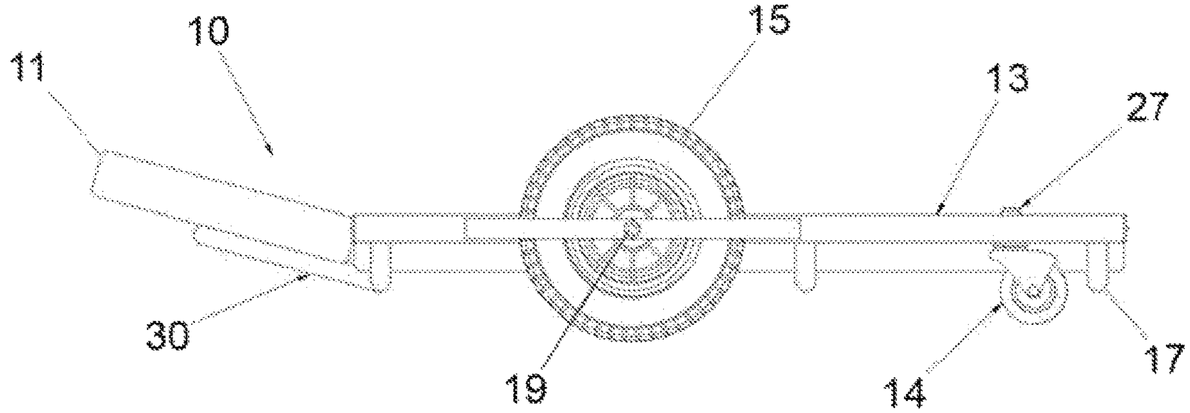
FIG. 2 is a side view of the creeper of FIG. 1.
Figure 3:
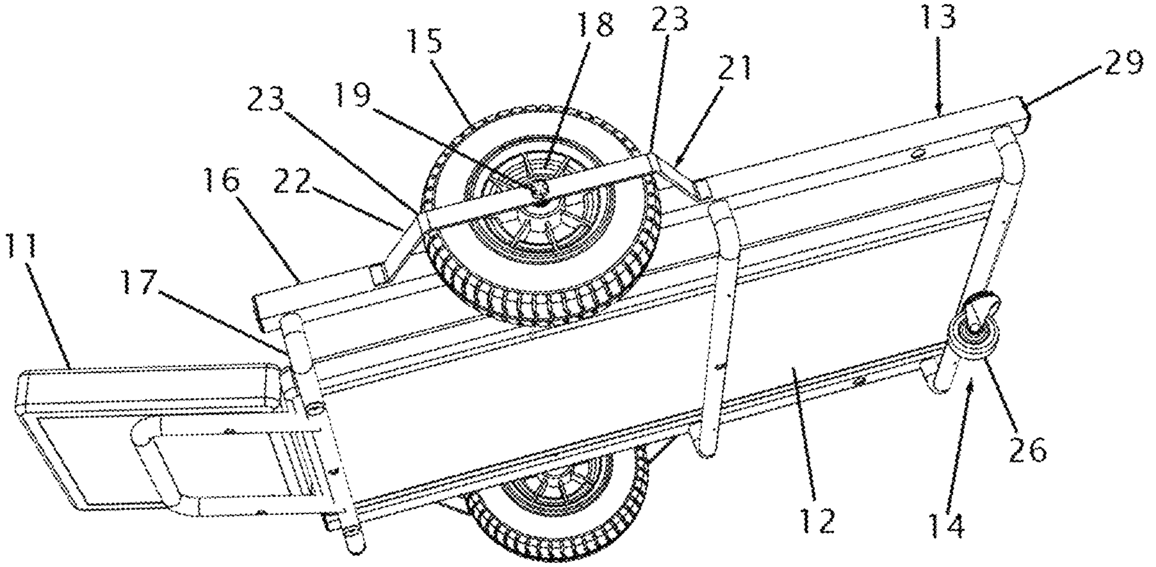
FIG. 3 is an alternative bottom perspective view of the creeper of FIG. 1, though showing one caster assembly secured to a cross-rail and positioned in a generally middle location relative to the length of the cross-rail.
Figure 4:
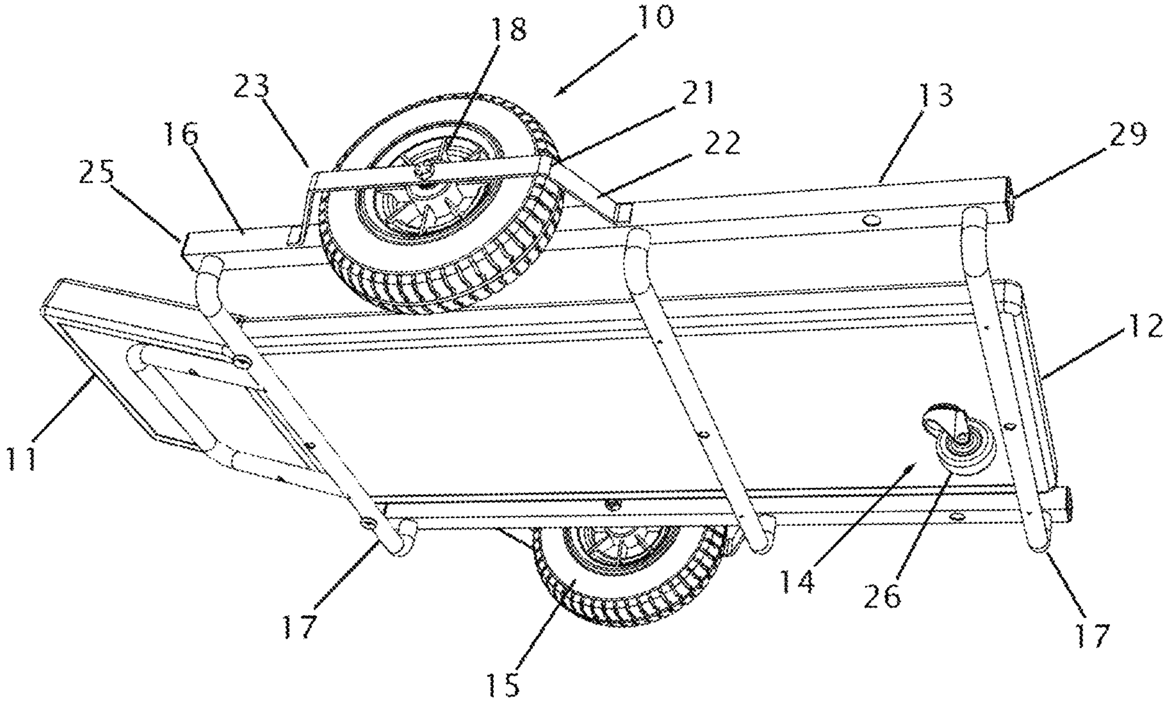
FIG. 4 is an alternative bottom perspective view of the creeper of FIG. 1, though showing one caster assembly secured to a body pad and positioned in a generally middle location relative to the width of body pad.

One or more embodiments of the present invention relate to a creeper, such as often used by a mechanic when servicing vehicles. Embodiments of the invention relate to a creeper providing enhanced mobility. Advantageously, the creeper allows a user to pivot, steer, and move the creeper in a tight, detailed way. The creeper includes two fixed, non-swivel, larger wheels in an upper-middle section of a frame. The creeper includes at least one smaller swivel caster mounted in a lower section of the frame. A user can tilt their shoulders toward the ground in the direction of a headrest pad to thereby lift the at least one swivel caster off the ground, which may also be referred to as a wheelie. Then, with only the fixed, larger wheels touching the ground, the user can pivot, steer, and move the creeper in the tight, detailed way. And when both the fixed, larger wheels and the at least one swivel caster are on the ground, the creeper can be maneuvered using the at least one swivel caster to steer, while the larger wheels would allow for movement over cracks and uneven terrain.

With reference to the Figures, a creeper made in accordance with embodiments of the present invention is generally indicated by the numeral 10 and includes a headrest pad 11, a body pad 12, a frame generally indicated by the numeral 13, a plurality of caster assemblies generally indicated by the numeral 14, and a plurality of non-swivel wheels 15. The caster assemblies 14 and non-swivel wheels 15 render creeper 10 mobile. While the Figures show creeper 10 having two caster assemblies 14, it is also envisioned that only one caster assembly 14 could be utilized, such as by positioning the one caster assembly 14 in a more middle location, as further discussed herein.

The headrest pad 11 and the body pad 12 are supported by the frame 13. The frame 13 can include a portion 30 which extends at an upward angle, generally relative to body pad 12, in order to provide the headrest pad 11 at a desired upward angle. Headrest pad 11 is provided for supporting the head of the user and can be made of a foam or the like. Frame 13 includes opposed longitudinally extending side rails 16 and a plurality of latitudinally extending cross-rails 17 extending between the side rails 16. Cross-rails 17 particularly support the body pad 12, which body pad 12 is provided for supporting the body of the user and can be made of a foam or the like.

The plurality of non-swivel wheels 15 can include an opposed pair of non-swivel wheels 15, as shown in the Figures. Non-swivel wheels 15 are large, extending above the height of the side rails 16. Non-swivel wheels 15, which may also be referred to as fixed wheels 15 or larger wheels 15, are rotatably carried on axles 18 supported by side rails 16. The axles 18 can be a bolt 18, as shown in the Figures. In this configuration, a bolt head 19 abuts the side rail 16 and a nut 20 secures the bolt 18 in position.

Non-swivel wheels 15 are positioned within a respective bracket 21. That is, non-swivel wheels 15 are positioned between bracket 21 and frame 13. Other configurations for positioning non-swivel wheels 15 relative to frame 13 may also be suitable.

Bracket 21 includes a first angled portion 22 extending from a side of the frame 13 and to a straight portion 23. The straight portion 23 extends to a second angled portion 24 which second angled portion 24 extends back to the side of the frame 13. Said another way, the straight portion 23 is positioned between the two angled portions 22, 24. The axle 18 is shown as being positioned centrally relative to the straight portion 23, though other configurations may be suitable.

Non-swivel wheels 15 are positioned nearer to a first end 25 of side rails 16 which first end 25 is nearer headrest pad 11. The positioning of axles 18 may be characterized relative to the overall length of side rails 16, which may be defined with first end 25 as a starting point. That is, starting from first end 25, the axles 18 may be positioned at from about 10% to about 50% of the length of side rails 16, starting from first end 25 as a starting point. The axles 18 should not be positioned beyond where a user's shoulders would normally be positioned in order to allow for the wheelie function disclosed herein. The positioning of axles 18 and non-swivel wheels 15 should be considered relative to the positioning of the at least one caster assembly 14 in order to achieve the desired functions of creeper 10 disclosed herein.

As shown in the Figures, the caster assemblies 14, which may also be referred to as swivel casters 14, can be mounted with the frame 13, such that wheels 26 are positioned below frame 13 to thereby support the frame 13. As shown, this can include a stem 27 of the caster assembly 14 being positioned through the frame 13. In the configuration shown in the Figures, the stem 27 is secured in place with a fastener 28 abutting the top of the frame 13. Other configurations for the caster assemblies 14 may be utilized, such as threading a stem into a threaded hole within the frame 13, or mounting the caster assemblies 14 with the body pad 12.

The wheels 26, which may also be referred to as swivel wheels 26, of caster assemblies 14 are positioned nearer to a second end 29 of side rails 16 which second end 25 is away from headrest pad 11 and near an end of the body pad 12. The positioning of caster assemblies 14, that is, the stems 27 thereof, may be characterized relative to the overall length of side rails 16, which may be defined with second end 29 as a starting point. That is, starting from second end 29, the stems 27 may be positioned at from about 0% to about 33% of the length of side rails 16, starting from second end 29 as a starting point. That is, relative to the use of about 0% as a lower part of the position range, caster assemblies 14 can be positioned exactly at the second end 29 in some embodiments. The positioning of caster assemblies 14 can be adapted relative to the positioning of axles 18 and non-swivel wheels 15 in order to achieve the desired functions of creeper 10 disclosed herein.

As mentioned above, while the Figures show creeper 10 having two caster assemblies 14, it is also envisioned that only one caster assembly 14 could be utilized. In these embodiments, the one caster assembly 14 would be positioned in a generally middle location. That is, the one caster assembly 14 could be secured to body pad 12 and positioned in a generally middle location relative to the width of body pad 12. In other embodiments, the one caster assembly 14 could be secured to a cross-rail 17, such as an end cross-rail 17, and positioned in a generally middle location relative to the length of the cross-rail 17.

Non-swivel wheels 15 and the wheels 26 of caster assemblies 14 may be characterized by the size thereof. Non-swivel wheels 15 can be about 5 inches to about 10 inches in diameter, and in other embodiments, about 6 inches to about 8 inches in diameter. Wheels 26 of caster assemblies 14 can be about 0.5 inches to about 3 inches in diameter, and in other embodiments, about 2 inches to about 3 inches in diameter. These sizes for the non-swivel wheels 15 and the wheels 26 of caster assemblies 14 can also be used to generate relative ratios. That is, for example, the non-swivel wheels 15 can be at least three times the diameter of the wheels 26 of caster assemblies 14, or in other embodiments, at least one-and-a-half times the diameter of the wheels 26 of caster assemblies 14. The specific sizes of the non-swivel wheels 15 and the wheels 26 of caster assemblies 14, and the corresponding ratios thereof, can be adapted to achieve the desired functions of creeper 10 disclosed herein.

As suggested above, the creeper 10 of embodiments of the present invention provides improved methods of moving the creeper 10. A user can tilt their shoulders toward the ground in the direction of headrest pad 11 to thereby lift the wheels 26 of caster assemblies 14. In this position, which may also be referred to as a wheelie, only the non-swivel wheels 15 would be in contact with the ground. With only the non-swivel wheels 15 touching the ground, the user can pivot, steer, and move the creeper 10 in the tight, detailed way. When both the non-swivel wheels 15 and the wheels 26 of caster assemblies 14 are on the ground, the creeper 10 can be maneuvered using the wheels 26 of caster assemblies 14 to steer, while the larger non-swivel wheels 15 allow for improved movement over cracks and uneven terrain.

In light of the foregoing, it should be appreciated that the present invention advances the art by providing an improved creeper. While particular aspects of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A creeper providing improved mobility, the creeper comprising a frame including longitudinally extending side rails and latitudinally extending cross-rails extending between the side rails, the cross-rails supporting a body pad, an upper-middle portion of the side rails including non-swivel wheels, a lower portion of the creeper including a caster assembly, the non-swivel wheels having a diameter at least one-and-a-half times a diameter of a wheel of the caster assembly, the non-swivel wheels being secured by respective brackets extending from the side rails, the non-swivel wheels being rotatably carried on respective axles extending between the side rails and the brackets.

2. The creeper of claim 1, the lower portion of the creeper including a plurality of caster assemblies, the plurality of caster assemblies being positioned within a lower portion of the side rails.

3. The creeper of claim 1, the non-swivel wheels having a height extending above a height of the side rails.

4. The creeper of claim 1, the brackets including a straight portion positioned between two angled portions, the two angled portions including a first angled portion and a second angled portion, the first angled portions extending from sides of the side rails and to the straight portions, the second angled portions extending from the straight portions and back to the sides of the side rails.

5. The creeper of claim 1, the non-swivel wheels being rotatably carried on respective axles supported by the side rails.

6. The creeper of claim 1, the lower portion of the creeper including a plurality of caster assemblies, the caster assemblies including respective stems within the side rails.

7. The creeper of claim 6, the plurality of caster assemblies including respective swivel wheels.

8. The creeper of claim 1, the caster assembly being the only caster assembly positioned at the lower portion of the creeper.

9. The creeper of claim 8, the caster assembly being secured with the body pad and positioned in a generally middle location relative to a width of the body pad.

10. A creeper providing improved mobility, the creeper comprising a frame including longitudinally extending side rails and latitudinally extending cross-rails extending between the side rails, the cross-rails supporting a body pad, an upper-middle portion of the side rails including non-swivel wheels, a lower portion of the creeper including a caster assembly, the non-swivel wheels having a diameter at least one-and-a-half times a diameter of a wheel of the caster assembly, the non-swivel wheels being secured by respective brackets extending from the side rails, the brackets including a straight portion positioned between two angled portions, the two angled portions including a first angled portion and a second angled portion, the first angled portions extending from sides of the side rails and to the straight portions, the second angled portions extending from the straight portions and back to the sides of the side rails.

11. The creeper of claim 10, the non-swivel wheels being rotatably carried on respective axles supported by the side rails, the axles being positioned centrally within the straight portions.

12. A creeper providing improved mobility, the creeper comprising a frame including longitudinally extending side rails and latitudinally extending cross-rails extending between the side rails, the cross-rails supporting a body pad, an upper-middle portion of the side rails including non-swivel wheels, a lower portion of the creeper including a caster assembly, the non-swivel wheels having a diameter at least one-and-a-half times a diameter of a wheel of the caster assembly, the caster assembly being the only caster assembly positioned at the lower portion of the creeper, the caster assembly being secured with one of the latitudinally extending cross-rails and positioned in a generally middle location relative to a length of the one cross-rail.

13. A creeper providing improved mobility, the creeper comprising a frame including longitudinally extending side rails and latitudinally extending cross-rails extending between the side rails, the cross-rails supporting a body pad, the frame carrying non-swivel wheels and a caster assembly with a swivel wheel, the non-swivel wheels being rotatably carried on respective axles supported by the side rails, the non-swivel wheels consisting of a first non-swivel wheel positioned at a first side of an upper-middle section of a frame and a second non-swivel wheel positioned at a second side of the upper-middle section of the frame, the caster assembly being positioned at a lower portion of the creeper.

14. The creeper of claim 13, the non-swivel wheels being secured by respective brackets extending from the side rails.

15. The creeper of claim 13, the lower portion of the creeper including a plurality of caster assemblies, the plurality of caster assemblies being positioned within a lower portion of the side rails.

16. The creeper of claim 13, the caster assembly being the only caster assembly positioned at the lower portion of the creeper, the caster assembly being secured with either one of the latitudinally extending cross-rails or with the body pad.

17. A creeper providing improved mobility, the creeper comprising a frame including longitudinally extending side rails and latitudinally extending cross-rails extending between the side rails, the cross-rails supporting a body pad, the frame carrying non-swivel wheels and a caster assembly with a swivel wheel, the non-swivel wheels being rotatably carried on respective axles supported by the side rails, the caster assembly being positioned at a lower portion of the creeper, the non-swivel wheels being secured by respective brackets extending from the side rails, the brackets including a straight portion positioned between a first angled portion and a second angled portion, the first angled portions extending from sides of the side rails and to the straight portions, the second angled portions extending from the straight portions and back to the sides of the side rails.

18. The creeper of claim 17, the axles being positioned centrally within the straight portions.

* * * * *